United States Patent
Zhou et al.

(10) Patent No.: US 7,796,115 B2
(45) Date of Patent: Sep. 14, 2010

(54) SCROLLING FUNCTION IN AN ELECTROPHORETIC DISPLAY DEVICE

(75) Inventors: Guofu Zhou, Eindhoven (NL); Mark Thomas Johnson, Eindhoven (NL); Jan Van De Kamer, Heerlen (NL); Rogier Cortie, Eindhoven (NL); Mischa Eduard Tanja Nelis, Heerlen (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 808 days.

(21) Appl. No.: 11/572,572

(22) PCT Filed: Jul. 19, 2005

(86) PCT No.: PCT/IB2005/052410

§ 371 (c)(1),
(2), (4) Date: Jan. 24, 2007

(87) PCT Pub. No.: WO2006/013502

PCT Pub. Date: Feb. 9, 2006

(65) Prior Publication Data

US 2008/0291184 A1    Nov. 27, 2008

(30) Foreign Application Priority Data

Jul. 27, 2004  (EP) ................... 04103596

(51) Int. Cl.
*G09G 3/34* (2006.01)
(52) U.S. Cl. ............... 345/107; 345/208; 345/214; 345/690; 349/86; 349/91; 359/296; 359/317; 359/320

(58) Field of Classification Search ............... 345/107, 345/208, 211–214, 690; 349/86–91; 359/296, 359/317, 320
See application file for complete search history.

(56) References Cited

U.S. PATENT DOCUMENTS

| 5,961,804 | A | 10/1999 | Jacobson et al. |
| 6,067,068 | A * | 5/2000 | Hussain ............... 345/686 |
| 6,112,839 | A | 9/2000 | Ostler et al. |
| 6,130,774 | A | 10/2000 | Albert et al. |
| 7,012,600 | B2 * | 3/2006 | Zehner et al. ......... 345/214 |
| 7,411,720 | B2 * | 8/2008 | Honeyman et al. ..... 359/296 |

FOREIGN PATENT DOCUMENTS

| EP | 0186519 A2 | 7/1986 |
| WO | WO9506307 A1 | 3/1995 |
| WO | WO9953373 A1 | 10/1999 |
| WO | WO03044765 A2 | 5/2003 |
| WO | WO03079324 A1 | 9/2003 |

* cited by examiner

*Primary Examiner*—Henry N Tran (57) ABSTRACT

Bi-stable electrophoretic display device (1) having a normal mode and a scrolling mode, in which image transitions are effected by causing the charged particles (8,9) to toggle between the intermediate optical states (e.g. grey-to-grey) or between an extreme optical state and an intermediate optical state (e.g. white-to-light grey), with a corresponding short update time $t_{scroll}$. When the device (1) enters a scrolling mode in response to a scrolling command from a user, picture elements are first driven to a special scrolling optical. state, after which drive waveforms for scrolling mode are used for fast toggling between two scrolling states. An increased scrolling speed and very short scrolling time can be realized, without adversely affecting image quality during a normal mode.

26 Claims, 5 Drawing Sheets

SCROLLING FUNCTION IN AN ELECTROPHORETIC DISPLAY DEVICE

This invention relates generally to an electrophoretic display device comprising an electrophoretic material comprising charged particles in a fluid, a plurality of picture elements, first and second electrodes associated with each picture element, the charged particles being able to occupy a position being one of a plurality of positions between said electrodes, said positions corresponding to respective optical states including first and second extreme optical states and at least one intermediate optical state, the device further comprising drive means arranged to supply a drive waveform to the electrodes, the drive waveform comprising a sequence of drive signals for effecting image transitions by causing said particles to occupy respective predetermined optical states corresponding to image information to be displayed.

An electrophoretic display comprises an electrophoretic medium consisting of charged particles in a fluid, a plurality of picture elements (pixels) arranged in a matrix, first and second electrodes associated with each pixel, and a voltage driver for applying a potential difference to the electrodes of each pixel to cause the charged particles to occupy a position between the electrodes, depending on the value and duration of the applied potential difference, so as to display a picture.

In more detail, an electrophoretic display device is a matrix display with a matrix of pixels which are associated with intersections of crossing data electrodes and select electrodes. A grey level, or level of colorization of a pixel, depends on the time a drive voltage of a particular level is present across the pixel. Dependent on the polarity of the drive voltage, the optical state of the pixel changes from its present optical state continuously towards one of the two limit situations (i.e. extreme optical states), e.g. one type of charged particles is near the top or near the bottom of the pixel. Intermediate optical states, e.g. greyscales in a black and white display, are obtained by controlling the time the voltage is present across the pixel.

Usually, all of the pixels are selected line-by-line by supplying appropriate voltages to the select electrodes. The data is supplied in parallel via the data electrodes to the pixels associated with the selected line. If the display is an active matrix display, the select electrodes are provided with, for example, TFT's, MIMs, diodes, etc., which in turn allow data to be supplied to the pixel. The time required to select all of the pixels of the matrix display once is called the sub-frame period. In known arrangements, a particular pixel either receives a positive drive voltage, a negative drive voltage, or a zero drive voltage during the whole sub-frame period, depending on the change in optical state, i.e. the image transition, required to be effected. In this case, a zero drive voltage is usually applied to a pixel if no image transition (i.e. no change in optical state) is required to be effected.

A known electrophoretic display device is described in international patent application WO 99/53373. This patent application discloses an electronic ink display comprising two substrates, one of which is transparent, and the other is provided with electrodes arranged in rows and columns. A crossing between a row and a column electrode is associated with a picture element. The picture element is coupled to the column electrode via a thin-film transistor (TFT), the gate of which is coupled to the row electrode. This arrangement of picture elements, TFT transistors and row and column electrodes together forms an active matrix. Furthermore, the picture element comprises a pixel electrode. A row driver selects a row of picture elements and the column driver supplies a data signal to the selected row of picture elements via the column electrodes and the TFT transistors. The data signal corresponds to the image to be displayed.

Furthermore, an electronic ink is provided between the pixel electrode and a common electrode provided on the transparent substrate. The electronic ink comprises multiple microcapsules of about 10 to 50 microns. Each microcapsule comprises positively charged black particles and negatively charged white particles suspended in a fluid. When a positive field is applied to the pixel electrode, the black particles move to the side of the microcapsule on which the transparent substrate is provided, such that they become visible/black to a viewer. Simultaneously, the white particles move to the opposite side of the microcapsule, such that they are hidden from the viewer. Similarly, by applying a negative field to the pixel electrode, the white particles move to the side of the microcapsule on which the transparent substrate is provided, such that they become visible/white to a viewer. Simultaneously, the white particles move to the opposite side of the microcapsule, such that they are hidden from the viewer. When the electric field is removed, the display device substantially remains in the acquired optical state, and exhibits a bi-stable character.

Intermediate optical states can be created in the display device by controlling the amount of particles that move to the counter electrode at the top of the microcapsules. For example, the energy of the positive or negative electric field, defined as the product of field strength and the time of application, controls the amount of particles moving to the top of the microcapsules. In a black and white display, for example, using black and white particles, intermediate optical states are often referred to as "grey states" or "grey scales". For simplicity, the term "grey scale" is used herein in relation to the described exemplary embodiments.

Figure 1:
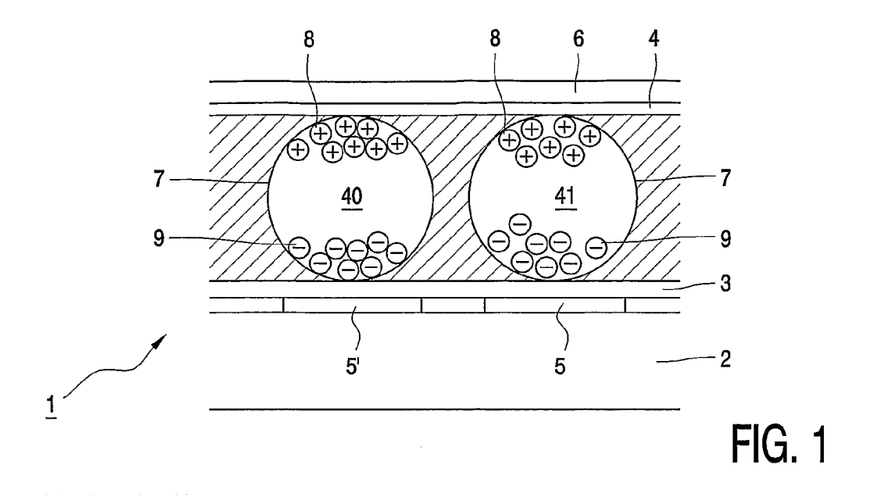
FIG. 1 is a schematic cross-sectional view of a portion of an electrophoretic display device.

FIG. 1 of the drawings is a diagrammatic cross-section of a portion of an electrophoretic display device 1, for example, of the size of a few picture elements, comprising a base substrate 2, an electrophoretic film with an electronic ink which is present between a top transparent electrode 6 and multiple picture electrodes (5,5'). The electronic ink comprises multiple microcapsules 7 of about 10 to 50 microns. Each microcapsule 7 comprises positively charged black particles 8 and negatively charged white particles 9 suspended in a fluid 40. The material 41 surrounding the microcapsules 7 is a polymer binder. The layer 3 is not essential or it could be a glue layer. When a positive field is applied to a picture electrode 5,5' with respect to the counter-electrode 6, the white particles 9 are drawn towards the electrode 5,5' by the generated electric field and are hidden from the viewer, whereas the black particles 8 remain near the opposite electrode 6 and become visible black to a viewer. Conversely, if a negative field is applied to a picture electrode 5,5' the black particles are drawn towards the electrode 5,5' and are hidden from the viewer, whereas the white particles remain near the opposite electrode 6 and become visible white to a viewer (not shown). In theory, when the electric field is removed, the particles 8, 9 substantially remain in the acquired state and the display exhibits a bi-stable character and consumes substantially no power.

Electrophoretic media are known per se from e.g. U.S. Pat. Nos. 5,961,804, 6,112,839 and 6,130,774 and may be obtained from E Ink Corporation.

Figure 2:
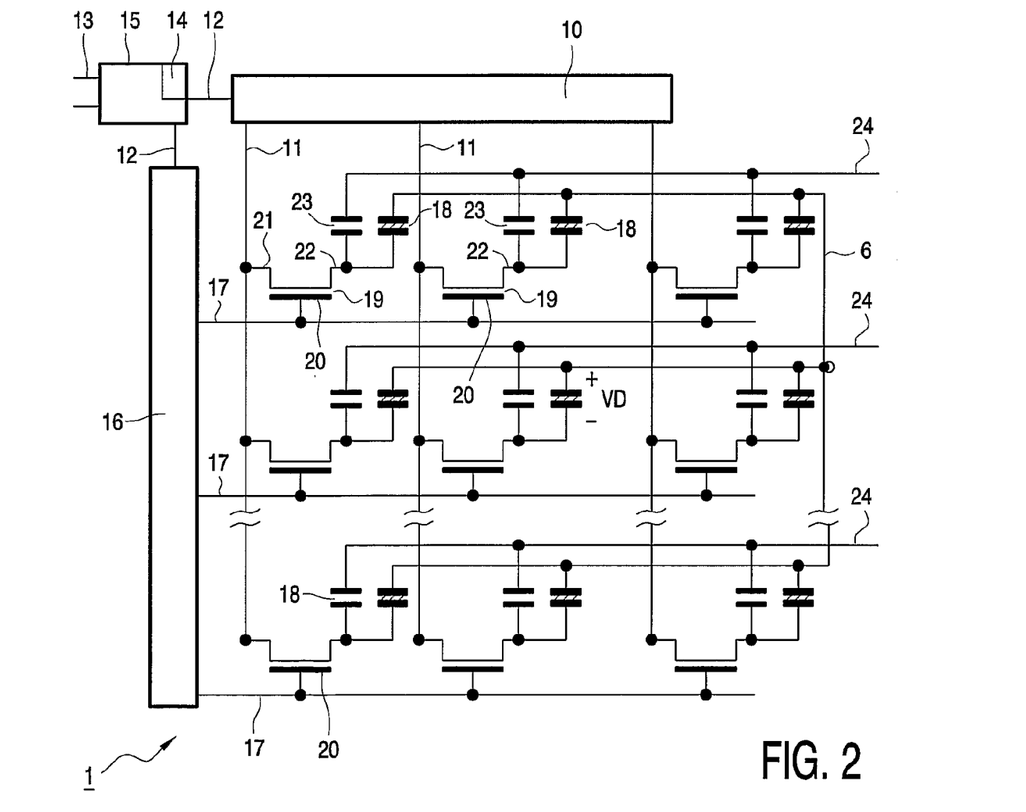
FIG. 2 shows diagrammatically a picture display apparatus with an equivalent circuit diagram of a portion of an electrophoretic display.

FIG. 2 shows diagrammatically a picture display apparatus with an equivalent circuit diagram of a portion of the electrophoretic display. The picture display device 1 comprises an electrophoretic film laminated on the base substrate 2 provided with active switching elements 19, a row driver 16 and a column driver 10. Preferably, the counter electrode 6 is provided on the film comprising the encapsulated electrophoretic ink, but, the counter electrode 6 could be alternatively provided on a base substrate if a display operates based on using in-plane electric fields. The counter electrode 6 may be segmented. Usually, the active switching elements 19 are thin-film transistors TFT. The display device 1 comprises a matrix of display elements associated with intersections of row or selection electrodes 17 and column or data electrodes 11. The row driver 16 consecutively selects the row electrodes 17, while the column driver 10 provides data signals in parallel to the column electrodes 11 for the selected row electrode 17. Preferably, a processor 15 firstly processes incoming data 13 into the data signals to be supplied by the column electrodes 11.

The drive lines 12 carry signals which control the mutual synchronisation between the column driver 10 and the row driver 16.

The row driver 16 supplies an appropriate select pulse to the gates of the TFT's 19 which are connected to the particular row electrode 17 to obtain a low impedance main current path of the associated TFT's 19. The gates of the TFT's 19 which are connected to the other row electrodes 17 receive voltages such that their main current paths have a high impedance. The low impedance between the source electrodes 21 and the drain electrodes of the TFT's allows the data voltages present at the column electrodes 11 to be supplied to the drain electrodes which are connected to the pixel electrodes 22 of the pixels 18. In this manner, a data signal present at the column electrode 11 is transferred to the pixel electrode 22 of the pixel or display element 18 coupled to the drain electrode of the TFT if the TFT is selected by an appropriate level on its gate. In the embodiment shown, the display device of FIG. 1 also comprises an additional capacitor 23 at the location of each display element 18. This additional capacitor 23 is connected between the pixel electrode 22 and one or more storage capacitor lines 24. Instead of TFT's, other switching elements can be used, such as diodes, MIMs, etc.

Electrophoretic displays are considered to be advantageous relative to, for example, their LCD equivalents, in terms of brightness, contrast ratio, view angle and power consumption. However, the switching time of an electrophoretic display is often relatively long. For example, in current known displays, a minimum of around 400 ms is required for driving the display from a first extreme optical state (e.g. full black or white) to a second extreme optical state (e.g. full white or black). Furthermore, in order to ensure the required image quality, additional driving (overdrive) may also be required to reduce image retention. In fact, it has been experimentally observed that an update time of around 700 ms is required to achieve the required quality of black and white display performance. However, such a switching time is far too long for the purposes of scrolling (line-to-line or page-to-page, say) for many applications, such as an e-dictionary or e-book, where an update time of less than 100 ms for scrolling would be more appropriate.

Thus, it is an object of the present invention to provide an electrophoretic display device in respect of which a relatively fast scrolling function is provided, without a reduction in image quality for the purposes of reading displayed image information. It is also an object of the invention to provide a method of driving such an electrophoretic display device. It is also an object of the invention to provide drive means for driving such an electrophoretic display device.

In accordance with the present invention, there is provided an electrophoretic display device comprising an electrophoretic material comprising charged particles in a fluid, a plurality of picture elements, first and second electrodes associated with each picture element, the charged particles being able to occupy a position being one of a plurality of positions between said electrodes, said positions corresponding to respective optical states including at least first and second extreme optical states and at least one intermediate optical state, the device further comprising drive means arranged to supply a drive waveform to said electrodes, said drive waveform comprising a sequence of drive voltage pulses corresponding to image data signals for effecting image transitions by causing said particles to occupy respective predetermined optical states corresponding to image information to be displayed, said device being arranged to enable a user to effect scrolling of displayed image information by generating a scrolling command, in response to which charged particles occupying positions corresponding to a first extreme optical state are caused to occupy said at least one intermediate optical state and image transitions are effected during scrolling by causing said particles to occupy positions corresponding to either said at least one intermediate optical state or any other optical state.

Also in accordance with the present invention, there is provided a method of driving an electrophoretic display device comprising an electrophoretic material comprising charged particles in a fluid, a plurality of picture elements, first and second electrodes associated with each picture element, the charged particles being able to occupy a position being one of a plurality of positions between said electrodes, said positions corresponding to respective optical states including at least first and second extreme optical states and at least one intermediate optical state, the method comprising supplying a drive waveform to said electrodes, said drive waveform comprising a sequence of drive signals for effecting image transitions by causing said particles to occupy respective predetermined optical states corresponding to image information to be displayed, said device being arranged to enable a user to effect scrolling of displayed image information by generating a scrolling command, the method further comprising, in response to a scrolling command, causing charged particles occupying positions corresponding to a first extreme optical state to occupy said at least one intermediate optical state and effecting image transitions during scrolling by causing said particles to occupy positions corresponding to either said at least one intermediate optical state or any other optical state.

Also in accordance with the present invention, there is provided a method of searching for or obtaining information using an electrophoretic display device using a scrolling mode entered in response to the generation of a scrolling command. The information may be train/plan schedule, new book viewing or weather broadcasting.

The present invention extends to a method of searching for or obtaining information using an electrophoretic display device as defined above, using a scrolling mode entered in response to the generation of a scrolling command.

Also in accordance with the present invention, there is provided drive means for driving an electrophoretic display device, said electrophoretic display device comprising an electrophoretic material comprising charged particles in a fluid, a plurality of picture elements, first and second electrodes associated with each picture element, the charged particles being able to occupy a position being one of a plurality of positions between said electrodes, said positions corresponding to respective optical states including at least first and second extreme optical states and at least one intermediate optical state, said drive means being arranged to supply a drive waveform to said electrodes said drive waveform comprising a sequence of drive voltage pulses corresponding to image data signals for effecting image transitions by causing said particles to occupy respective predetermined optical states corresponding to image information to be displayed, said device being arranged to enable a user to effect scrolling of displayed image information by generating a scrolling command, in response to which charged particles occupying positions corresponding to a first extreme optical state are caused to occupy said at least one intermediate optical state and image transitions are effected during scrolling by causing said particles to occupy positions corresponding to either said at least one intermediate optical state or any other optical state.

The extreme optical states according to the invention are referred to as the optical states of a pixel with maximum brightness and minimum brightness in a given application. For example, the full black and full white states are the extreme optical states when both states are used in a pixel in one application. In some applications, a lower than the maximum contrast ratio is specified by the application, or chosen by a user, for example for displaying the grey tones on a pixel, in which the dark grey may represent the most dark state and the light grey state may represent the most bright. In this case, the dark grey state and the light grey state may be considered as the extreme states according to the invention.

The term "scrolling mode" in the context of the present invention may be understood to mean any fast operating mode on the entire display screen or part of the screen. So, the scrolling mode may include the fast operations on the entire display screen or part of the screen line-by-line or page-to-page. For example, in e-dictionary or e-book applications, line-by-line scrolling often occurs when (fast) searching for a word is being performed, and fast page-to-page update or scrolling occurs when fast searching for a page or sentence of interest is being performed. Also, the scrolling mode according to this invention is applicable for internet browsing, in particular when the detailed information is of less interest or less importance than a higher image update speed. This may occur when one starts a fast searching operation. There is a trade-off between the image readability and the scrolling speed and the user may be able to pre-set a proper scrolling speed according to a specific application. Short drive waveforms are used for fast scrolling (with lower contrast ratio so lower readability) and longer drive waveforms are used for slower scrolling (with higher contrast ratio so increased readability).

The electrophoretic display device according to the invention may be applied in respect of any e-reading devices such as PDAs, GPS, e-books, e-dictionaries, e-newspapers and the like. On the display screen, it is also possible to have multiple display regions, with each region possibly being independently operable. For example, one region may be used for fast scrolling. Within this region, the pixels are updated using the short drive waveforms designed for fast scrolling mode during scrolling. The background, outside this region, could be arranged to remain the same such that no update is required. This often occurs in, for example, e-dictionary applications, when one searches for a word by scrolling in the scrolling region while other content in the background need not change. In this way additional power savings can be made.

The present invention offers significant advantages over prior art arrangements, including the provision of a relatively fast scrolling function, while maintaining the required quality of displayed image information during a reading function by a user.

In a first exemplary embodiment, image transitions may be effected during scrolling by causing the particles to occupy either the at least one intermediate optical state or the second extreme optical state corresponding to image information to be displayed.

In a second exemplary embodiment, there may be at least two intermediate optical states, wherein in response to said scrolling command, charged particles occupying a first extreme optical state are caused to occupy a first intermediate optical state and charged particles occupying a second extreme optical state are caused to occupy a second intermediate optical state, and image transitions are effected during scrolling by causing the particles to occupy either the first or the second intermediate optical state corresponding to image information to be displayed.

Image transitions may be effected during scrolling by causing the particles to occupy either the at least one optical state or the another optical state and a further optical state between the at least one intermediate optical state and the another optical state.

In any event, the device is preferably arranged to return to a normal operating mode, in which image transitions are effected by causing the particles to occupy any of the optical states corresponding to image information to be displayed, after scrolling of displayed image information is terminated. Beneficially, scrolling of displayed image information may be determined to be terminated a predetermined period of time after a last scrolling command is generated.

The extreme optical states preferably comprise the brightest and darkest states. The device is beneficially arranged to enter scrolling mode by bringing the particles directly from their extreme states to the closest grey states desired for use during scrolling. Alternatively, the device may be arranged to enter a scrolling mode by firstly bringing the particles to an opposite extreme state and then sending the particles to one or more desired intermediate optical states to be used for scrolling. In a preferred embodiment, the device may be arranged to exit the scrolling mode by returning the particles back to the extreme optical states from which they were brought upon entry to the scrolling mode. In a first exemplary embodiment, the device may be arranged to exit the scrolling mode by restoring the particles to an extreme optical state closest thereto. In a second exemplary embodiment, the device may be arranged to exit the scrolling mode by restoring the particles to an extreme optical state furthest therefrom.

The drive waveform is defined as a sequence of voltage pulses corresponding to the image data signals for effecting image transitions by causing the particles to occupy respective predetermined optical states. A drive waveform may include one or more reset voltage pulses, drive pulses and one or more shaking pulses. A shaking pulse is defined as a voltage pulse representing energy sufficient for releasing particles at one of the extreme positions near the electrodes but insufficient for moving the particles from the extreme position to another extreme position. One or more shaking pulses may be provided prior to one or more of the drive signals. The energy value of each shaking pulse is beneficially insufficient to significantly change the optical state occupied by said charged particles.

It will be appreciated that, in a preferred embodiment, image transitions include picture elements without substantial optical state change.

A device according to a preferred embodiment, comprises two substrates, at least one of which is substantially transparent, wherein the charged particles are present between the two substrates. The charged particles and the fluid are preferably encapsulated, more preferably in a plurality of individual microcapsules, each defining a respective picture element.

The drive waveform may be pulse width modulated or voltage modulated, and is preferably substantially dc-balanced. The drive waveform preferably further includes one or more reset pulses.

The device may comprise at least two sub-windows or regions wherein scrolling might be achieved in one of the sub-windows. In one embodiment, a first sub-window may not be updated during a scrolling time period, wherein scrolling may occur in a second sub-window in respect of the display device.

The device may be arranged and configured to provide a pre-set function for enabling a user to select a scrolling speed in accordance with a specific application and a required image quality. It will be appreciated that, in one exemplary embodiment, the same image data is displayed during a normal operating mode and a scrolling mode, and only different (i.e. shorter) drive waveforms are used to distinguish the two modes of operation. In an alternative exemplary embodiment, image data used for a normal operating mode may be first mapped onto scrolling data upon receipt of a scrolling command, following which drive waveforms designed for fast scrolling are used to effect image transitions.

The device of the present invention is preferably arranged and configured to allow a user to browse through displayed image data. It will be appreciated that the device of the present invention may be arranged and configured to support line-by-line and/or page-to-page scrolling.

These and other aspects of the present invention will be apparent from, and elucidated with reference to, the embodiments described herein.

Embodiments of the present invention will now be described by way of examples only and with reference to the accompanying drawings, in which.

Thus, it has been established that update times of 400 ms and even 700 ms are required for effecting image transitions, so as to maintain a desired level of displayed image quality in respect of an electrophoretic display device. On the other hand, it has been observed that the image quality (i.e. the "readability) of displayed image information becomes of much less relevance during scrolling of such displayed image information, as opposed to during reading such information, and in fact the image quality decreases in relevance with an increase in the speed of scrolling. The present invention uses this observation, and proposes the use of a separate scrolling mode in an electrophoretic display device, which allows fast scrolling with a lower contrast ratio, together with a transition mechanism for entering and exiting such a scrolling mode.

During scrolling, a relatively fast update time, e.g. 100 ms or less, for image transitions is achievable, whereas a slower update mode (required to achieve the desired image quality) is used during reading (or relatively slow scrolling), in which mode the optical performance of the display is preferably optimised to guarantee the best possible quality of displayed image information. A transition technique for entering and exiting the scrolling mode is also proposed.

Figure 3:
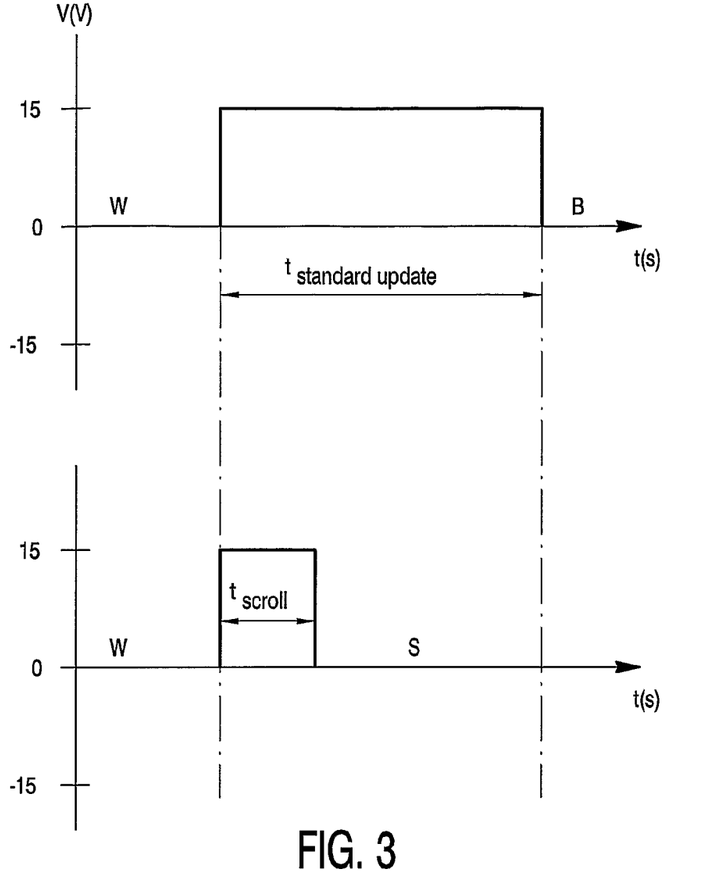
FIG. 3 illustrates representative drive waveforms in respect of a first exemplary embodiment of the present invention.

Referring to FIG. 3 of the drawings, there is illustrated, in the upper diagram, an exemplary drive waveform for an image transition from a white extreme optical state to a black extreme optical state, illustrating the relatively long update time associated therewith, and, in the lower diagram, a drive waveform for effecting image transitions in a scrolling mode according to a first exemplary embodiment of the present invention. It can be seen that a relatively long image update time $t_{standard\ update}$ is required in a reading mode because the image quality and optical performance are of the greatest importance. On the other hand, readability of displayed image information is of significantly less relevance during fast scrolling than the speed of the scrolling itself. Thus, the drive waveform in accordance with the first exemplary embodiment of the present invention provides a relatively short image update time $t_{scroll}$ in a scrolling mode, which results in a somewhat reduced optical contrast ratio.

In a first exemplary embodiment of the present invention, image transitions between an extreme optical state (e.g. white or black) and an intermediate optical state (e.g. grey) are used for the scrolling mode, and an update time ($t_{scroll}$) to scroll an image during scrolling can be below 100 ms. To enter the scrolling mode upon the reception of the first scrolling request command, the pixels at black state should be first sent to the desired scrolling grey state (S), which state will be later achievable from white state during scrolling. When the subsequent scrolling command is received, the waveforms for scrolling mode are used for toggling between white and the grey (S) states. When scrolling is terminated, e.g. after a predetermined time interval (e.g. 0.5 s) in which no scrolling command is received, the pixels at the grey (S) state have to be first brought back to the desired black state using a "restore" waveform, after which the display may be updated using the waveforms for standard update mode. This process is repeated during subsequent cycles.

An alternative method of entering the scrolling mode upon the reception of the first scrolling request command is that the pixels at black state are first brought to white state and then sent to the desired scrolling grey state (S), which state will be later achievable from the white state during scrolling. When the subsequent scrolling command is received, the waveforms for scrolling mode are used for toggling between white and the grey (S) states. When scrolling is terminated, the pixels at the grey (S) state have to be first brought back to the desired black state using a "restore" drive waveform, which can also be realized via white state, i.e. the pixels at grey state (S) are first brought to the white state and then sent to the black state. When the black state is restored, the display may be updated using the waveforms for standard update mode.

During scrolling in the scrolling mode, the image data may optically remain the same as in the (slow) "standard" image update mode. Only different drive waveforms designed for scrolling mode are used upon the reception of scrolling command. The scrolling drive waveforms are much shorter than those for the "standard" update so that fast scrolling can be achieved. In this example, the pixels receiving image information as black state in normal/standard operating mode will be updated as the grey state (S) during scrolling in scrolling mode. After finishing scrolling, the black state of these pixels will be restored from the grey state used during scrolling. Alternatively, the data may be modified to represent scrolling specific date, for example if an image with a many greyscales is to be scrolled with two scrolling levels, all dark grey levels can, for example, be mapped as black levels, whilst all light grey levels can, for example, be mapped as white levels. In this manner, only 2-level data needs to be present.

Figure 4:
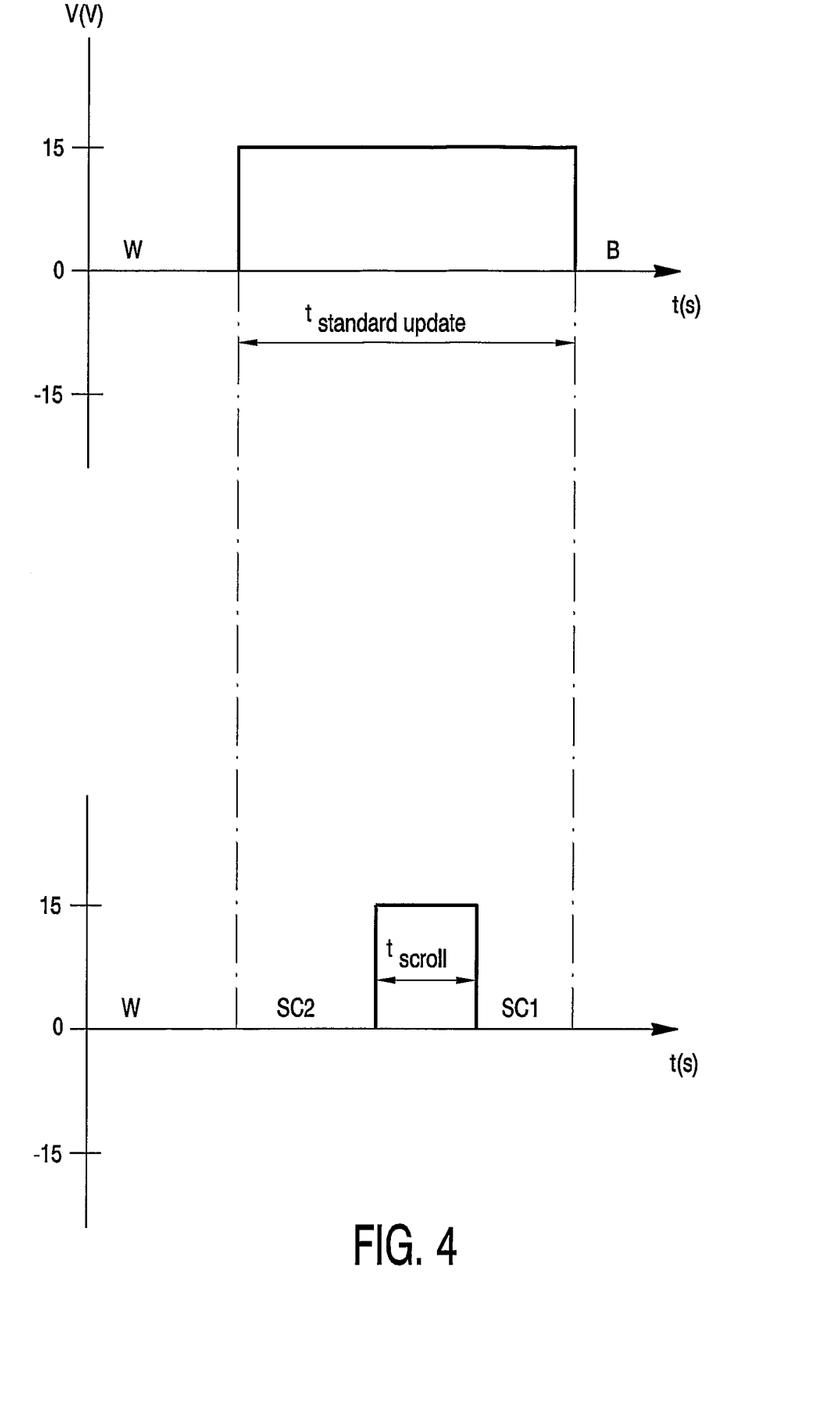
FIG. 4 illustrates representative drive waveforms in respect of a second exemplary embodiment of the present invention.

Referring to FIG. 4 of the drawings, there is illustrated, in the upper diagram, an exemplary drive waveform for an image transition from a white optical state to a black optical state, illustrating the relatively long update time associated therewith, and, in the lower diagram, a drive waveform for effecting image transitions in a scrolling mode according to a second exemplary embodiment of the present invention.

Figure 5:
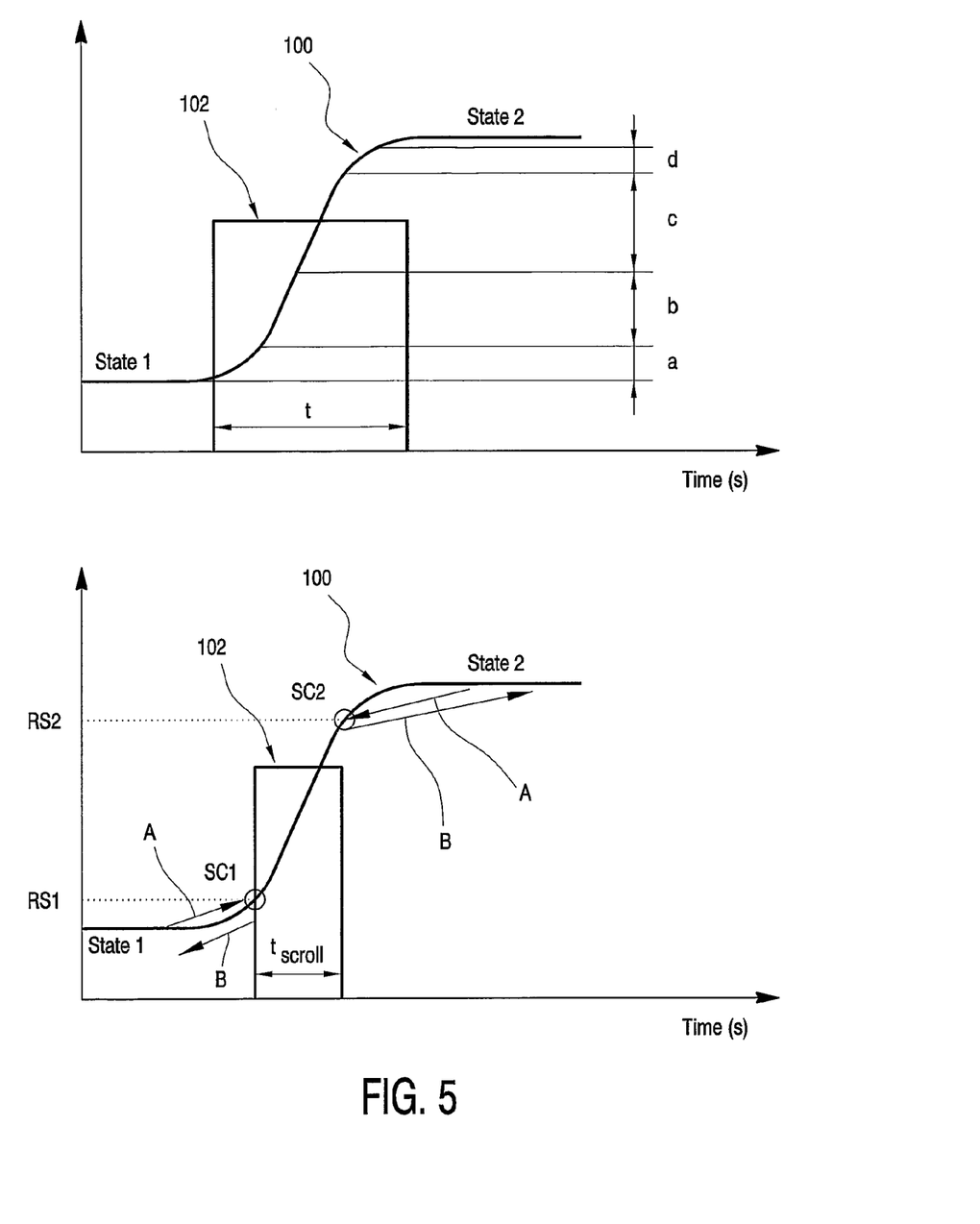
FIG. 5 illustrates graphically the optical response (100) of an electrophoretic display, and corresponding image update voltage pulse (102) between first and second optical states during a scrolling mode (lower diagram) relative to that during a reading mode (upper diagram)

In a second embodiment of the present invention, image transitions between intermediate optical states (e.g. light grey and dark grey) are used for scrolling mode. The update time can be very short with significantly improved optical performance because the ink behaviour is non-linear during switching, i.e. with the same amount of energy the optical effect is maximized between light grey (SC2) and dark grey (SC1) transitions, as illustrated in FIG. 5. With the same pulse time in pulse-width modulated drive or the same amount of energy, a lower contrast ratio is realized between grey and extreme state transitions than between first and second grey states. The corresponding waveform for a transition from light grey (SC2) to dark grey (SC1) is shown in FIG. 4 and FIG. 5 (lower diagram) with a very short update time, indicated as $t_{scroll}$. The update time during scrolling can be below 100 ms. With the same image update time as in the first exemplary embodiment, a better contrast ratio is obtained. To enter the scrolling mode upon the reception of the first scrolling request command, the pixels at black state should be first sent to the desired scrolling dark grey state (SC1) and the pixels at white state should be first sent to the desired scrolling light grey state (SC2). Both grey states are used during scrolling. When a subsequent scrolling command is received, the waveforms for scrolling mode are used for toggling between the light grey (SC2) to dark grey (SC1). When scrolling is terminated, e.g. after a time interval of, say, 0.5 s of not receiving a scrolling command, the pixels at dark grey (SC1) state have to be first brought back to the desired black state and, preferably simultaneously, the pixels at light grey (SC2) state have to be first brought to the desired white state, after which the display is to be updated using the waveforms for standard update mode. The procedure of entering and exiting a scrolling mode is also indicated in FIG. 5 (lower diagram) by arrows A and B respectively. This process is repeated during subsequent scrolling cycles.

Again, an alternative method of entering the scrolling mode upon the reception of the first scrolling request command is that the pixels at black state are first brought to white state and then sent to the desired scrolling dark grey state (SC1) and the pixels at white state are first brought to black state and then sent to the desired scrolling light grey state (SC2). A further alternative method of entering the scrolling mode is that the pixels at black state are first brought to the white state and then sent to the desired scrolling light grey state (SC2) and the pixels at white state are first brought to black state and then sent to the desired scrolling dark grey state (SC1). When the subsequent scrolling command is received, the waveforms for scrolling mode are used for toggling between the dark grey (SC1) and the light grey (SC2) states. When scrolling is terminated, the pixels have to be first brought back to the desired black or white state using a "restore" drive waveform. There are two possible ways for restoring the scrolling grey states (SC1, SC2) to the extreme states, i.e. (a) direct restore to the desired extremes or (b) the opposite rail. Direct restore from the scrolling grey state may result in minimum flicker and via the opposite rail may result lower artefacts/ghosting level.

Also during scrolling in the scrolling mode, the image data may remain the same as in the (slow) "standard" image update mode. Only different drive waveforms designed for scrolling mode are used upon the reception of scrolling command. The scrolling drive waveforms are much shorter than those for the "standard" update so that fast scrolling can be achieved. In this example, the pixels receiving image information as black state in normal/standard operating mode will be updated as the dark grey state (SC1) during scrolling in scrolling mode and the pixels receiving image information as white state in normal/standard operating mode will be updated as the light grey state (SC2). After finishing scrolling, both the black and white states of these pixels will be restored from the grey states (SC1, SC2) used during scrolling. Alternatively, the data may be modified to represent scrolling specific data, for example if an image with a many grey scales is to be scrolled with two scrolling levels, all dark grey levels can e.g. be mapped as black levels, whilst all light grey levels can e.g. be mapped as white levels. In this manner, only two level data need be present.

It is also possible that the pixels receiving image information as black state in normal/standard operating mode will be updated as the light grey state (SC2) during scrolling in scrolling mode and the pixels receiving image information as white state in normal/standard operating mode will be updated as the dark grey state (SC1), i.e. inverting image. After finishing scrolling, both the black and white states of these pixels will be restored from the grey states (SC1, SC2) used during scrolling.

Figure 6A:
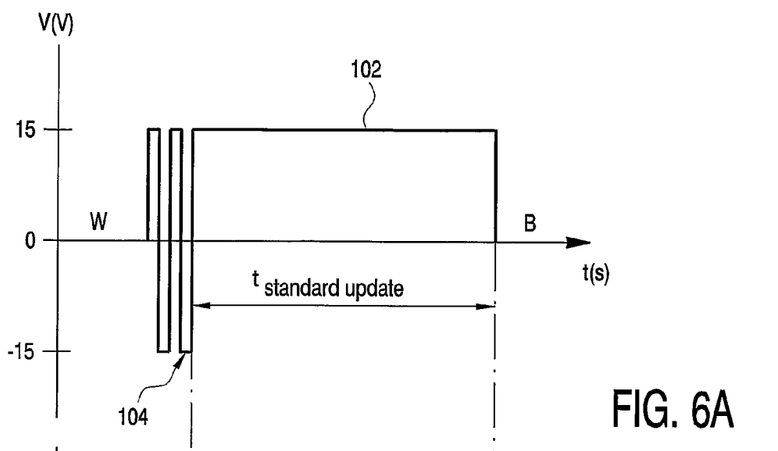
FIGS. 6A-6C illustrate representative drive waveforms in respect of third and fourth exemplary embodiments of the present invention.
Figure 6B:
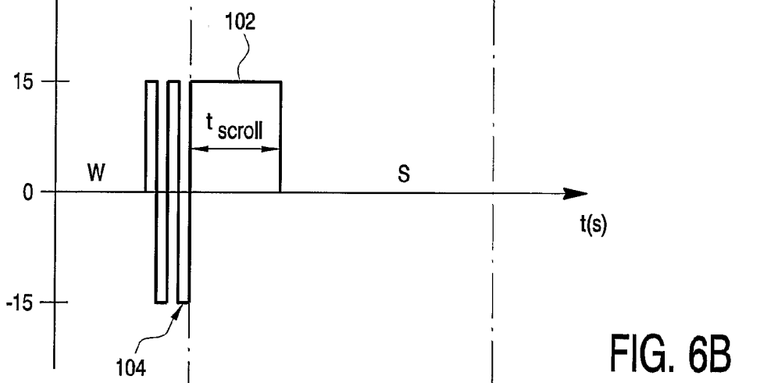
Figure 6C:
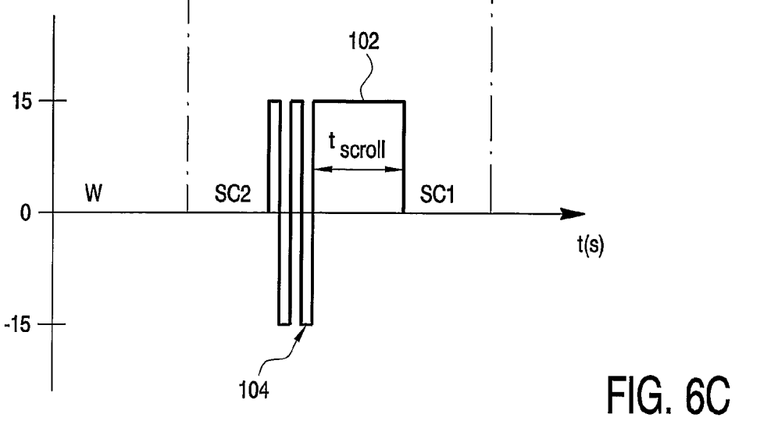

Third and fourth exemplary embodiments of the present invention may be derived from first and second exemplary embodiments respectively, as shown schematically in FIGS. 6A-6C of the drawings. A set of shaking pulses is applied prior to (and/or during) various drive waveforms (in a reading mode (FIG. 6A), a scrolling mode according to the third exemplary embodiment of the invention (FIG. 6B) and a scrolling mode according to a fourth exemplary embodiment of the invention (FIG. 6C)), for improving image quality by reducing both the dwell time and image history effect. A set of shaking pulses (104) may consist of one or more shaking pulses. A shaking pulse is defined as a voltage pulse representing energy sufficient for releasing particles at one of the extreme positions near the electrode but insufficient for moving the particles from one of the extreme positions to the other one of the extreme positions. Multiple sets of shaking pulses may be applied during the drive waveforms.

Figure 7:
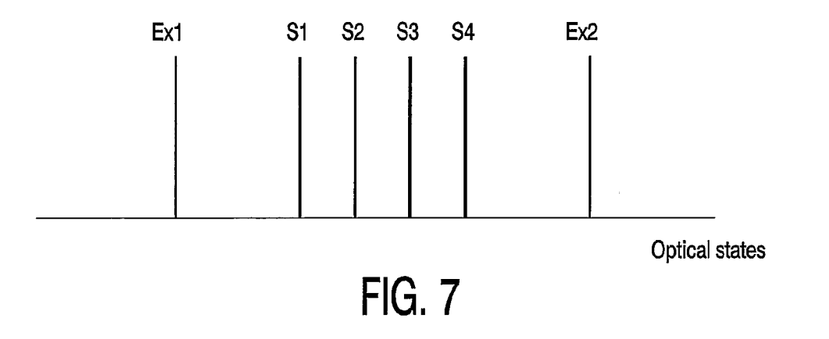
FIG. 7 illustrates the use of multiple intermediate states for scrolling in respect of a fifth exemplary embodiment of the present invention.

A fifth exemplary embodiment involves the use of more than two grey levels for scrolling but all situated at brightest levels between the scrolling levels as described above, as illustrated schematically in FIG. 7 of the drawings (S1, S2, S3 ... Sn). Ex 1 and Ex 2 represent two extreme states and S1, S2, S3, S4 the multiple intermediate optical states which may be used for the scrolling mode. The increased number of grey levels may increase the details or readability of the displayed image without delay in scrolling.

Thus, the present invention provides a method of addressing an electrophoretic display wherein a fast scrolling function is provided, as well as high quality images for reading. In fact, as the speed of scrolling increases, and the image quality becomes of increasingly less relevance, a very short update time can be realised for scrolling, which will significantly broaden the application of bi-stable electrophoretic displays. It will be appreciated that the present invention is applicable in respect of any type of scrolling, e.g. line-to-line scrolling and page-to-page scrolling. The present invention is also applicable to colour electrophoretic displays. In summary, when entering the scrolling mode upon reception of a scrolling command, pixels are first driven to the special scrolling optical states, after which the drive waveforms for scrolling mode are used for fast toggling between the two scrolling grey states. After completion of a scrolling operation, e.g. after a time interval of, say, 0.5 seconds without receiving a scrolling command, the pixels are first restored to the optical states required to achieve the desired image quality during standard update, after which drive waveforms for standard update mode are used.

It will be appreciated that, in the above examples, pulse-width modulated (PWM) driving is used for illustrating the invention, where the pulse time is varied in each waveform while the voltage amplitude is kept constant. However, the invention is also applicable to other driving schemes, e.g. based on voltage modulated driving (VM), where the pulse voltage amplitude is varied in each waveform, or combined PWM and VM driving. The invention is applicable to colour as well as grey scale bi-stable displays. Also, the electrode structure is not limited. For example, a top/bottom electrode structure, honeycomb structure, an in-plane switching structure or other combined in-plane-switching and vertical switching may be used. Moreover, the invention may be implemented in passive matrix as well as active matrix electrophoretic displays. Also the invention is applicable to both single and multiple window displays, where, for example, a typewriter mode exists or a special window for scrolling.

It should be noted that the above-mentioned embodiments illustrate rather than limit the invention, and that those skilled in the art will be capable of designing many alternative embodiments without departing from the scope of the invention as defined by the appended claims. In the claims, any reference signs placed in parentheses shall not be construed as limiting the claims. The word "comprising" and "comprises", and the like, does not exclude the presence of elements or steps other than those listed in any claim or the specification as a whole. The singular reference of an element does not exclude the plural reference of such elements and vice-versa. The invention may be implemented by means of hardware comprising several distinct elements, and by means of a suitably programmed computer. In a device claim enumerating several means, several of these means may be embodied by one and the same item of hardware. The mere fact that certain measures are recited in mutually different dependent claims does not indicate that a combination of these measures cannot be used to advantage.

The invention claimed is:

1. An electrophoretic display device (1) comprising;
   an electrophoretic material comprising charged particles (8,9) in a fluid (10), a plurality of picture elements, first and second electrodes (5,6) associated with each picture element, the charged particles (8,9) being able to occupy a position being one of a plurality of positions between said electrodes (5,6), said positions corresponding to respective optical states including at least first and second extreme optical states and at least one intermediate optical state, the device (1) further comprising;
   drive means arranged to supply a drive waveform to said electrodes (5,6) said drive waveform comprising a sequence of drive voltage pulses corresponding to image data signals (102) for effecting image transitions by causing said particles (8,9) to occupy respective predetermined optical states corresponding to image information to be displayed, said device (1) being arranged to enable a user to effect scrolling of displayed image information by generating a scrolling command, in response to which charged particles (8,9) occupying positions in a first extreme optical state are caused to occupy a first intermediate optical state and charged particles (8,9) occupying a second extreme optical state are caused to occupy a second intermediate optical state, wherein said first and said second intermediate optical states are those closest to a corresponding one of said first extreme and said second extreme optical states.

2. A device (1) according to claim 1, wherein when a scrolling command is generated, image data used in a normal operating mode of said device (1) is first mapped onto scrolling image data and then a drive waveform for a fast scrolling mode is used to effect image transitions in respect of said scrolling image data.

3. A device (1) according to claim 1, arranged and configured to allow a user to browse through displayed image data.

4. A device (1) according to claim 1, wherein image transitions are effected during scrolling by causing said particles (8,9) to occupy either said at least first intermediate optical state or said second intermediate optical state and a further optical state between the said first and second optical states.

5. A device (1) according to claim 1, where the extreme optical states are the brightest and darkest states.

6. A device (1) according to claim 1, arranged to enter a scrolling mode by bringing the particles directly from their extreme states to the closest intermediate optical states desired for use during scrolling.

7. A device (1) according to claim 1, arranged to enter a scrolling mode by firstly bringing the particles (8,9) to an opposite extreme state and then sending said particles (8,9) to one or more desired intermediate optical states to be used for scrolling.

8. A device (1) according to claim 1, arranged to exit a scrolling mode by returning the particles (8,9) back to the extreme optical states from which they were brought upon entry to the scrolling mode.

9. A device (1) according to claim 1, arranged to exit a scrolling mode by restoring the particles (8,9) to an extreme optical state closest thereto.

10. A device (1) according to claim 1, arranged to exit a scrolling mode by restoring the particles (8,9) to an extreme optical state furthest therefrom.

11. A device (1) according to claim 1, arranged to return to a normal operating mode, in which image transitions are effected by causing said particles (8,9) to occupy any of said optical states corresponding to image information to be displayed, after scrolling of displayed image information is terminated.

12. A device (1) according to claim 11, wherein scrolling of displayed image information is determined to be terminated a predetermined period of time after a last scrolling command is generated.

13. A device (1) according to claim 1, wherein said drive waveform further includes one or more shaking pulses (104).

14. A device (1) according to claim 13, wherein one or more shaking pulses (104) is provided prior to one or more of said drive signals (102).

15. A device (1) according to claim 13, wherein the energy value of each shaking pulse (104) is insufficient to significantly change the optical state occupied by said charged particles (8,9).

16. A device (1) according to claim 1, wherein image transitions include picture elements without substantial optical state change.

17. A device (1) according to claim 1, wherein said drive waveform further includes one or more reset pulses.

18. A device (1) according to claim 1, wherein a scrolling function includes line-by-line and/or page-to-page scrolling.

19. A device (1) according to claim 1, comprising a pre-set function for enabling a user to select a desired scrolling speed.

20. A device (1) according to claim 1, comprising a normal operating mode and a scrolling mode, wherein the same image data is utilized for display in both said normal operating mode and said scrolling mode, the drive voltage pulses of the drive waveform used in a scrolling mode being shorter than those of the drive waveform used in said normal operating mode.

21. A device (1) according to claim 1, containing at least two display sub-windows or regions.

22. A device (1) according to claim 21, wherein scrolling can be achieved in at least one of the sub-windows.

23. A device (1) according to claim 21, wherein a first sub-window is not updated during a time period of scrolling and wherein scrolling occurs in a second sub-window in respect of said display device (1).

24. A method of driving an electrophoretic display device (1) comprising an electrophoretic material comprising charged particles (8,9) in a fluid (10), a plurality of picture elements, first and second electrodes (5,6) associated with each picture element, the charged particles (8,9) being able to occupy a position being one of a plurality of positions between said electrodes (5,6), said positions corresponding to respective optical states including at least first and second extreme optical states and at least one intermediate optical state, the method comprising;

supplying a drive waveform to said electrodes (5,6), said drive waveform comprising a sequence of drive voltage pulses corresponding to image data signals (102) for effecting image transitions by causing said particles (8,9) to occupy respective predetermined optical states corresponding to image information to be displayed, said device (1) being arranged to enable a user to effect scrolling of displayed image information by generating a scrolling command, the method further comprising, in response to the scrolling command, causing charged particles (8,9) occupying positions in a first extreme optical state are caused to occupy a first intermediate optical state and charged particles (8,9) occupying a second extreme optical state are caused to occupy a second intermediate optical state, wherein said first and said second intermediate optical states are those closest to a corresponding one of said first extreme and said second extreme optical states.

25. A method according to claim 24, wherein said device (1) comprises at least two intermediate optical states, the method comprising causing, in response to a scrolling command, charged particles (8,9) occupying a first extreme optical state to occupy a first intermediate optical state and charged particles (8,9) occupying a second extreme optical state to occupy a second intermediate optical state, wherein said first and said second intermediate optical states are those closest to a corresponding one of said first extreme and said second extreme optical states, and effecting image transitions during scrolling by causing said charged particles (8,9) to occupy either said first or said second intermediate optical states corresponding to image information to be displayed.

26. Drive means for driving an electrophoretic display device, said electrophoretic display device (1) comprising an electrophoretic material comprising charged particles (8,9) in a fluid (10), a plurality of picture elements, first and second electrodes (5,6) associated with each picture element, the charged particles (8,9) being able to occupy a position being one of a plurality of positions between said electrodes (5,6), said positions corresponding to respective optical states including at least first and second extreme optical states and at least one intermediate optical state, said drive means being arranged to supply a drive waveform to said electrodes (5,6) said drive waveform comprising a sequence of drive voltage pulses corresponding to image data signals (102) for effecting image transitions by causing said particles (8,9) to occupy respective predetermined optical states corresponding to image information to be displayed, said device (1) being arranged to enable a user to effect scrolling of displayed image information by generating a scrolling command, in response to which charged particles (8,9) occupying positions in a first extreme optical state are caused to occupy a first intermediate optical state and charged particles (8,9) occupying a second extreme optical state are caused to occupy a second intermediate optical state, wherein said first and said second intermediate optical states are those closest to a corresponding one of said first extreme and said second extreme optical states.

* * * * *